Patented Aug. 9, 1927.

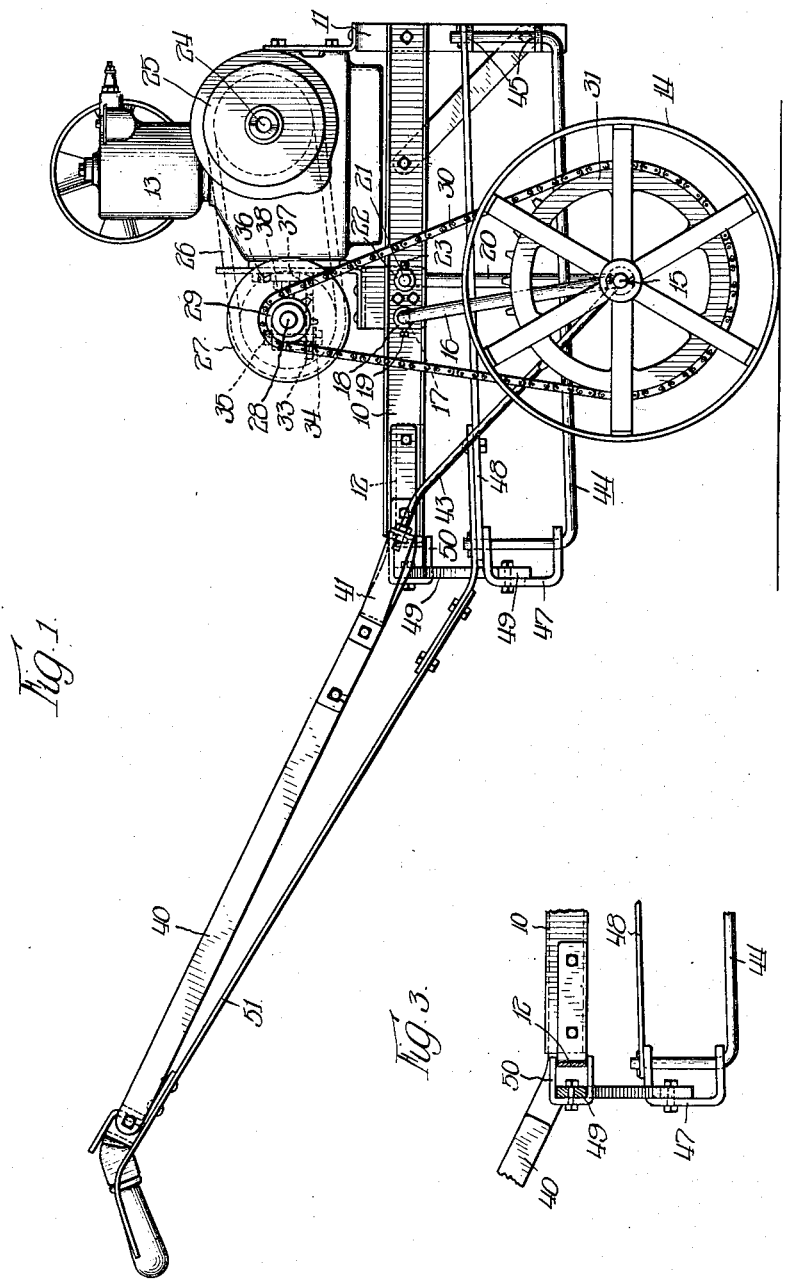

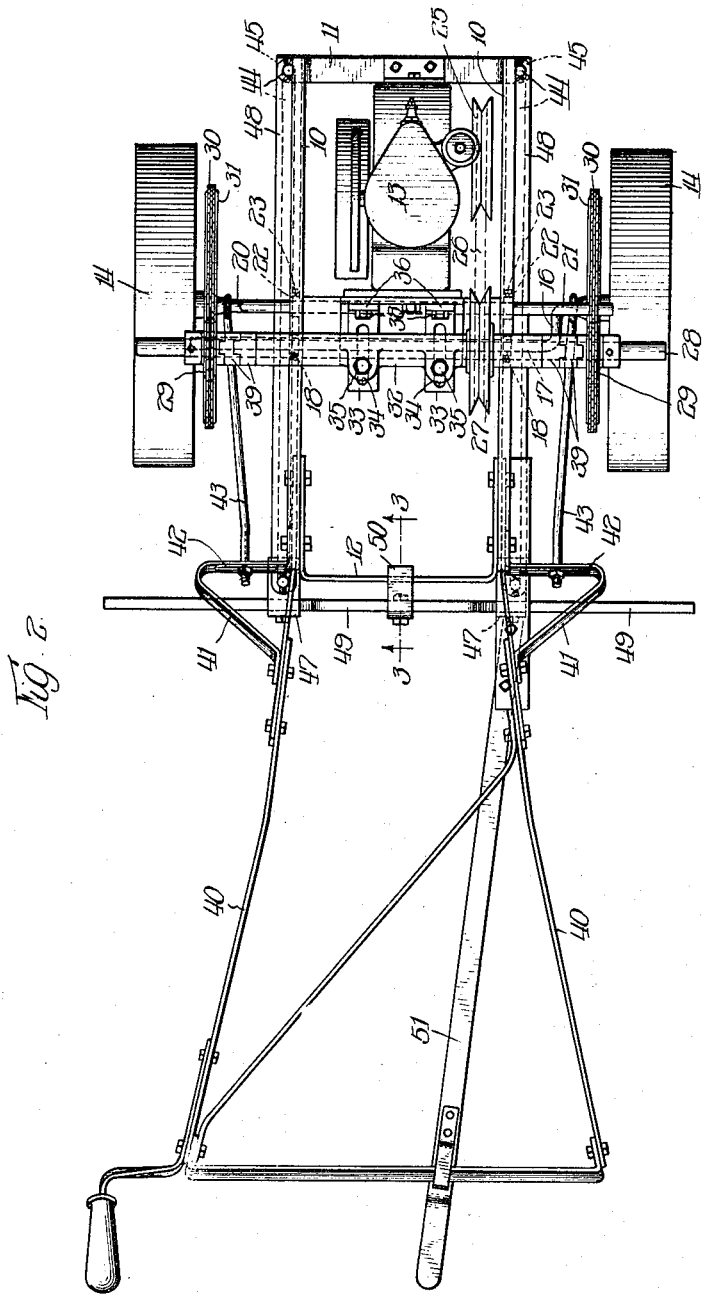

1,638,762

UNITED STATES PATENT OFFICE.

FORREST V. DONALD, OF PORT WASHINGTON, WISCONSIN, ASSIGNOR TO GILSON MANUFACTURING COMPANY, OF PORT WASHINGTON, WISCONSIN, A CORPORATION OF WISCONSIN.

GARDEN TRACTOR.

Application filed June 5, 1922. Serial No. 566,113.

This invention relates to a garden tractor and more particularly to a tractor having a frame to which garden tools, such as cultivating tools and the like, may be attached.

It is common practice to provide gardens with irrigation ditches. The distances between such ditches varies in different gardens, for example, some gardens have the irrigation ditches twenty-four inches apart, others have them thirty inches apart and, as a matter of fact, even in the same garden the distance between the irrigation ditches may vary. In all cases, however, the distances between irrigation ditches in a garden is substantially standard in that such distances usually vary from twenty-four to thirty inches, so that two rows of vegetation may be accommodated between adjacent irrigation ditches.

One object of the invention is to provide a simple, durable and efficient garden tractor, the parts of which are arranged whereby the propelling wheels may travel in irrigation ditches variable distances apart.

Another object is to provide such a garden tractor in which the propelling wheels may be adjusted toward or from each other in a simple manner in accordance with the variable distances between irrigation ditches.

Another object is to provide a garden tractor adapted to meet the various requirements under service conditions.

These and other objects are accomplished by means of the arrangement disclosed on the accompanying sheets of drawings, in which—

Figure 1 is a side elevation of a garden tractor embodying my invention;

Figure 2 is a top plan view of the same garden tractor; and

Figure 3 is a detail sectional view taken in the plane of line 3—3 of Figure 2.

The various novel features of the invention will be apparent from the following description and drawings, and will be particularly pointed out in the appended claims.

Referring to the figures of the drawings, it will be noted that I have disclosed my invention in connection with a tractor having a main frame including side bars 10 connected at their front ends by a cross frame member 11 and at their rear ends by a cross frame member 12. This main frame supports a propelling engine 13 for driving the ground engaging propelling wheels 14, the latter carrying the frame and other parts of the tractor. The right hand ground engaging wheel 14, as shown in Figure 2, is mounted upon the spindle portion 15 of an axle 16, the main horizontal portion 17 of which extends through and is supported by both of the side frame members 10. When once positioned in the side frame members 10, collars 18 slidably mounted upon said horizontal axle portion 17 and which engage the outer sides of the main frame members 10, are secured to the axle portion 17 by any suitable means, such as set screws 19, whereby the propelling wheel 14 is held in a given position laterally with respect to the main frame. In a similar manner the left hand ground engaging wheel 14 is mounted upon the spindle portion of an axle 20 having a main horizontal portion 21 which extends through the side frame members 10 and has slidably mounted thereon collars 22 located just outside of the main frame members 10 and in engagement therewith, said collars being secured to the axle portion 21 by any suitable means, such as set screws 23, for the purpose of normally preventing relative lateral movement between the left hand propelling wheel 14 and the frame. It is apparent, therefore, that the propelling wheels 14 may be adjusted inwardly toward each other and outwardly away from each other by merely loosening each of the collars on the horizontal axle portions 17 and 21. After the wheels have been thus adjusted, the collars again may be secured to the respective axle portions 17 and 21 at points directly adjacent the side frame members 10 for holding the propelling wheels 14 in adjusted position.

Propelling power is transmitted from the engine 13 through an engine shaft 24 upon which a sheave 25 is mounted, a belt 26 passing around said sheave and also around a sheave 27 mounted upon a shaft 28 carrying two sprocket wheels 29 around which chains 30 pass, said chains at either side passing around an associated sprocket wheel 31 operatively connected to its associated propelling wheel 14. This intermediate shaft 28 is mounted in a relatively long bearing housing 32 which is adjustably mounted lengthwise of the tractor on brackets 33. It will be noted that these brackets 33 have elongated slots 34 and that the bearing or housing 32 is adjustably secured to the brackets 33 by means of bolts 35 which extend through portions of the bearing 32 and through the elongated opening 34, nuts being applied to said bolts 35 for holding the shaft and its bearing in adjusted position. The intermediate shaft 28 also may be adjusted vertically by adjusting the brackets 33 in a vertical direction, such brackets being provided with upstanding portions 36 having elongated openings 37 through which securing means 38 pass. By means of these adjustments of the intermediate shaft 28, the driving belt 26 and the chains 30 may be maintained with the proper degree of tautness. For properly adjusting the positions of the sprocket wheels 29 on the intermediate shaft 28 when the sprocket wheels 31 are moved laterally with the propelling wheels 14, a plurality of spacing collars 39 are provided. It will be understood that when the distance between the wheels 14 is increased additional spacing collars 39 will be applied to the shaft and to the inner sides of the collars 29 and when the propelling wheels 14 are moved toward each other such spacing collars, or a desirable number of them, will be removed from the shaft.

Projecting rearwardly from the main frame members 10 are handle bars 40 through which the turning or steering movements of the tractor are controlled. Extending outwardly from these handle bars 40 and secured thereto are laterally extending brackets 41 each provided with an elongated slot 42 through each of which a radius or supporting rod 43 extends, said radius rod in each case being secured to its associated axle 16 and 20 respectively, for the purpose of holding said axles in proper position longitudinally with respect to the main frame. By providing the elongated slots 42, these radius or supporting rods 43 may be adjusted laterally with the propelling wheels 14.

As mentioned above, this tractor is particularly adapted for garden work and in this connection a tool draft frame is provided. This tool draft frame at each side of the tractor includes a U-shaped member 44, the front leg of each of which extends through ears 45 on the front frame member 11 and the rear leg of each frame member 44 extends upwardly through openings in the ears of a bracket 47. A bar 48 passes over the ends of the legs of the U-shaped member 44 and is secured thereto in any suitable manner. The brackets 47 have secured thereto a tool bar 49 to which tools of various description may be secured. Either individual tools or a group of tools which are secured to a carriage, may be connected to the tool bar 49. This tool bar 49 extends transversely across the rear of the tractor and is arched upwardly at its middle portion to clear vegetation over which it passes. Secured to the middle part of the arched tool bar 49 is a U-shaped bracket 50 which slidably receives main frame cross bar 12 whereby the rear portion of the tool draft frame is held in raised position. A control handle bar 51 is secured to the tool draft frame and more particularly to one of the frame bars 48. A relative movement between the tractor control bars 40 and the draft frame control bar 51 results in a relative movement between the tractor proper and the tool draft frame. Although the tractor frame and the tool draft frame are connected at their rear ends, such relative movement is permitted by virtue of the sliding connection between the bar 12 and the bracket 50.

It will be noted that the tractor frame and the draft frame are relatively high. This is to make possible the cultivation of the vegetation without injuring same as a result of the tractor frame passing into engagement with such vegetation when the propelling wheels 14 are moving along in the irrigating ditches.

In addition to the tool bar 49 being arched at its middle to avoid injuring the vegetation, the front frame bar 11 also is arched for the same reason.

It is my intention to cover all modifications of the invention falling within the spirit and scope of the following claims.

I claim:

1. In a garden tractor, the combination of a frame, propelling wheels, axles having portions secured in parallel relation to the frame and aligned portions on which the propelling wheels are mounted, the axles being adjustable laterally of the frame to permit the propelling wheels to travel in ditches spaced apart variable distances, and radius rods extending between the main frame and said axles for supporting the wheel bearing portions of the latter in aligned position, said radius rods being laterally adjustable in accordance with lateral adjustments of the axles.

2. In a garden tractor, the combination of a main frame, ground engaging propelling members, arched axles upon which said propelling members are mounted and which are adjustably connected to said frame whereby the propelling members may be adjusted laterally with respect to the frame to permit said propelling members to span variable distances for different conditions, and a tool draft frame carried under the main frame and permanently supported thereby, said draft frame normally fitting within the arch of the axles when in use.

Signed at Port Washington, Wisconsin, this 29th day of May, 1922.

FORREST V. DONALD.